(12) United States Patent
Khan et al.

(10) Patent No.: US 7,408,923 B1
(45) Date of Patent: Aug. 5, 2008

(54) IP TELEPHONY TRANSPORT

(76) Inventors: Mehtab Khan, 11034 Cross Land Dr., Austin, TX (US) 78726; Mohammad H. Raza, 20 Southampton, Irvine, CA (US) 92620

( * ) Notice: Subject to any disclaimer, the term of this patent is extended or adjusted under 35 U.S.C. 154(b) by 863 days.

(21) Appl. No.: 10/702,874

(22) Filed: Nov. 6, 2003

Related U.S. Application Data

(60) Provisional application No. 60/424,899, filed on Nov. 9, 2002.

(51) Int. Cl.
*H04L 12/66* (2006.01)
(52) U.S. Cl. ................... 370/352; 370/419; 713/300
(58) Field of Classification Search ............ None
See application file for complete search history.

(56) References Cited

U.S. PATENT DOCUMENTS

| | | | |
|---|---|---|---|
| 5,994,998 A * | 11/1999 | Fisher et al. ............... | 375/258 |
| 6,115,468 A * | 9/2000 | De Nicolo .................. | 379/413 |
| 6,346,964 B1 * | 2/2002 | Rogers et al. ............ | 348/14.11 |
| 6,535,983 B1 * | 3/2003 | McCormack et al. ....... | 713/310 |
| 6,580,710 B1 * | 6/2003 | Bowen et al. .............. | 370/353 |
| 6,643,566 B1 * | 11/2003 | Lehr et al. ................. | 700/286 |
| 6,701,443 B1 * | 3/2004 | Bell .......................... | 713/300 |
| 2001/0038635 A1 * | 11/2001 | Rogers ...................... | 370/419 |

* cited by examiner

*Primary Examiner*—Bob A Phunkulh
(74) *Attorney, Agent, or Firm*—Maria Erlinda Co Sarno

(57) ABSTRACT

A system for simultaneously transporting internet protocol voice traffic and power to an internet protocol telephony transport using the existing twisted pair infrastructure of a traditional phone system. The system includes a twisted pair broadband switch. The twisted pair broadband switch connects on one end to an internet protocol telephone voice switch using Ethernet wiring and connects on another end to a media converter using a twisted pair wiring on the existing twisted pair infrastructure. The media converter condition the voice traffic between a twisted pair interface and an Ethernet interface to allow connection to an internet protocol telephone. Power is simultaneously transported with the voice traffic over the same twisted pair wiring of the existing twisted pair infrastructure.

21 Claims, 8 Drawing Sheets

IP TELEPHONY TRANSPORT

This application claims the benefit of U.S. Provisional Patent Application Ser. No. 60/424,899 filed on Nov. 9, 2002.

BACKGROUND

The present invention is directed to a system for providing IP (Internet Protocol) telephony transport having an in-line power back-up at a customer site, using the existing twisted pair infrastructure usually made of a conducting material such as copper. Internet protocol as used herein means the exchange of communication and information between computers and various terminals such as in this case, telephones, in a network environment. The existing twisted pair copper infrastructure, is presently used for connecting analog and digital phones, hereinafter also referred to as traditional telephones, to a traditional PBX (telephone voice switch). This twisted pair copper infrastructure uses a lower grade cable. The claimed invention on the other hand, allows the connection of new IP telephones to an IP PBX (Internet Protocol based voice telephony switch) using the twisted pair copper wiring, by introducing a twisted pair broadband switch, hereinafter TPBS, and a media converter, also referred to as MC. Currently, in order to connect a computer or an IP telephone to an IP PBX, a higher grade cable is required which is different from the twisted pair copper wiring. The difference between an analog, digital and IP (internet protocol) telephone are described below. Analog telephones are also referred to as plain old telephone or POTS. These are the commercially available phones used in business and in residences and these can connect to various vendor switches. Digital phones are an upgrade of the analog phones which uses digital transmission of sound and these phones have advanced features that are not present in analog phones. Digital phones are proprietary to a particular vendor's voice switch. A digital phone from one vendor can not connect to a phone switch from another vendor. IP phones are more advanced than either of the analog or digital phones and these phones can connect to any Ethernet based interface to be part of a LAN (local area network) or WAN (wide area network) and use standards based IP technology. Because of the use of standard technology and protocol, IP telephones from one vendor may be used with telephone switches from another vendor.

Traditionally, voice and data have been running on separate physical networks, both within and outside the customer premises.

Traditional voice networks comprise of a PBX (voice switch), which handles call control, feature delivery and power delivery to the desktop telephones. A dedicated pair of wires 2 which terminate on a line card of the PBX, as shown in FIG. 1, comprise of the connection between the PBX and the analog or digital phone which is located at a user's desktop. This traditional telephony system is still used worldwide. These voice networks usually run over a lower grade cable such as Categories 1-3 (CAT1-3) cabling. The PBX switches have battery backup to ensure operation of the PBX during power outages and also provide power to the Analog or Digital Telephones through the PBX, over the copper wiring. Operation of the telephones during times of crises, especially when the building electrical power is impaired is a must for continued availability and operation of the phone system.

Within the last few years, data ran on Local Area Networks (LANs) within the customer premises. This network consists of various technologies including Ethernet, Token Ring, and ATM. Today Ethernet has emerged as the dominant LAN technology and has the greatest market share. The physical wiring that is required to run Ethernet is different from that used with the voice network described above. It is usually done with Category 5 (CAT5) cabling which is widely deployed within buildings. In the LAN, a computer is typically connected to a data switch or a router through CAT5 cabling which carries the Ethernet traffic. Networks transporting data such as LAN are typically not provided with battery backup, and therefore, are rendered dysfunctional in the event of power loss.

There has been a push towards convergence i.e. using the data network to transport voice. This is due to the fact that data traffic volumes have exceeded voice traffic and enterprises stand to save money by sending voice on data networks. Convergence is happening at the network level as well as at the applications level and IP has emerged as the dominant protocol. A vast majority of the enterprise LAN traffic uses IP and it is a natural choice that voice should also be transported over IP. Consequently, there has been a huge industry focus on VOIP (Voice over IP) as is evidenced by the number of product offerings by existing vendors and the amount of venture investment on new VOIP startups. Convergence of voice and data on the same network and technology can be expensive, and maintenance personnel have to learn new technologies and procedures to manage the converged network.

Additionally, data traffic and voice traffic not only have conflicting requirements for the underlying network, but such sources are intrinsically different. Data traffic sources are bursty in nature and typically consume large amounts of network bandwidth. On the other hand, voice is a very well defined source in terms of bandwidth usage as it is constant bit in nature i.e. when a voice call is active it consumes 64 kbps (on a time division multiplexing, TDM, network) of bandwidth for the duration of the call. Although voice is not bandwidth intensive, it is extremely sensitive to delays. Voice as an application has severe problems when delays are beyond certain threshold values and if network delays exceed beyond a certain point, voice conversation may become impossible. The first problem associated with delay is the appearance of echo which modern DSP (Digital Signal Processor) technology has solved with the introduction of echo cancellers. However, if delays become too great, user conversation collisions are possible and communication may become downright impractical (user might have to use "over" to hand over control to the other side). The voice problems anticipated with convergence lie somewhere in the middle, i.e. there isn't much perceivable echo, nor is there collision, but voice quality is choppy depending on the prevailing conditions on the network, a condition not suitable for conducting day to day communications. If voice and data share the same data network and enterprises have not spent the resources to make the LAN "voice ready", then users will experience this patchy voice performance.

Current systems carrying both data and voice traffic over the same wiring is shown in FIG. 3. LANs have historically been best effort networks and grew without any consideration given to QoS (Quality of Service) for handling delay-sensitive traffic like voice. At the time of inception no one had envisioned that someday LANs might be called upon to carry voice. During the last ten years there has been an astronomical growth in LAN traffic and this growth has mostly been "uncontrolled" i.e. corporations have installed LAN equipment to cope with the immediate need of accommodating increased data traffic without much thought given to performance guarantees. This has been acceptable because most LAN protocols are not delay sensitive and have recovery procedures at higher layers. They are concerned with information integrity, and getting information to the destination within reasonable time. LAN networks can tolerate delays that are of the order of seconds (even tens of seconds).

Until recently, providing timely delivery of voice traffic to the end-points was an issue as there was no way of ensuring QoS on a customer's LAN; when voice and data shared the network, traffic was switched on a first come first served basis. This set up is unsuitable for transporting voice over a LAN. The IEEE 802.1 committee released two specifications—802.1p and 802.1q, which allowed LAN hubs, switches and routers to prioritize traffic based upon the priority markings in an Ethernet frame. IEEE stands for Institute of Electrical and Electronics Engineers, Inc. which is a non-profit, technical professional association that releases various specifications on devices or equipment used in the field. While this solved the QoS issue, it is cost prohibitive for most legacy LAN networks. In order to get a prioritized LAN, it is required that enterprises swap out their old hardware and replace it with hardware that supports IEEE 802.1p and IEEE 802.1q. It is possible to undertake this upgrade in small enterprises, as the number of network elements that require swapping is small, however, in a medium to large enterprise, this could prove to be a daunting task, both from a cost standpoint as well as the disruption it causes to the data network and the overall business operation. If the upgrade goes awry, this has the potential of bringing the customer's entire voice and data network down.

Another problem that has prevented wide scale deployment of IP telephony is the fact that there is no true solution to providing in-line power to IP phones. Traditionally analog and digital phones have been powered from the central PBX, which in turn was battery backed up. The real reason for providing in-line power to phones in traditional PBX systems was to ensure that the system stayed up for a certain amount of time even when power to the facility was lost. The IP phone community is working on a standard called IEEE 802.3af, which defines a way of providing in-line power to IP phones through the un-used wires in the Ethernet wiring scheme. In practical deployments, IEEE 802.3af based equipment is placed in the data closet and provides in-line power to IP telephones. This solution gives a false sense of comfort to the customer that the IP phone is as resilient as the traditional telephones used to be. In fact, during a power outage, the data LAN goes out and consequently, voice connectivity goes out with it. To solve this issue, the enterprise customer has to provide battery backup for power to each and every LAN hub, switch and router. For IEEE 802.3af to be effective, it will require building a new battery backed power facility for the entire Data LAN. This may prove to be extremely expensive and in most cases may not be possible. In a brand new facility, this can be part of the planning process and the building can be designed with DC power to every data closet from day 1. However, there are only a few of these "Greenfield", that is, new installations.

Another concern voiced by IT (Information Technology) professionals is the lack of security on VOIP systems. An experienced hacker can connect a laptop PC to any Ethernet Wall-Jack in the building and record conversations long enough to break the code and subsequently listen in on all conversations. In the traditional phone system, a hacker had to have access to the physical wiring of the building at the MDF (Main Distribution Frame) to physically tap into the phone network to listen to conversations. In a normal business environment where thousands of wires run through, this is almost impossible, and access to the MDF is restricted.

It is therefore an object of this invention to provide an IP telephony system that can transport voice without experiencing delay in the voice transmission or transport.

It is an object of this invention to provide an IP telephony system using the existing twisted pair infrastructure.

It is also an object of this invention to provide an IP telephony system with in-line power, the source housed at the same location as the battery back up of the PBX, to ensure that the system is operational during building power outages.

It is a further object of this invention to provide an IP telephony system that is secured from unauthorized access.

SUMMARY OF THE INVENTION

This invention relates to a system for simultaneously transporting internet protocol voice traffic and power to an internet protocol telephony transport using existing twisted pair infrastructure, comprising a twisted pair broadband switch (TPBS), the twisted pair broadband switch connecting on one end to an internet protocol telephone voice switch using Ethernet wiring and connecting on another end to a media converter (MC) using a twisted pair wiring on the existing twisted pair infrastructure, the media converter conditioning voice traffic between a twisted pair interface and an Ethernet interface to allow connection to an internet protocol device such as a telephone; and, a power source connected to the twisted pair broadband switch for providing in-line power to the telephony system. Internet protocol (IP) telephony transport includes the TPBS, twisted pair wiring, MC and the IP telephone. The twisted pair broadband switch, TPBS, comprises several types of input/output interfaces, one of them, a twisted pair wiring interface using broadband technology. In a chassis configuration, the interface is a card comprising an ethernet switch chip for receiving Ethernet traffic and an Ethernet over broadband chip for conditioning the Ethernet traffic for transport over the twisted pair wiring, thereby allowing transport of internet protocol voice traffic within Ethernet frames over the twisted pair wiring. Other input/output interfaces also exist for other applications and for connections to other devices. Another main interface within a chassis type twisted pair broadband switch is an Ethernet interface which is a card having standard Ethernet ports for connectivity to Ethernet based applications and devices. The media converter comprises a twisted pair interface for receiving voice traffic and power from the twisted pair broadband switch through the twisted pair wiring, a twisted pair broadband chip for conditioning the Ethernet traffic to be carried on a broadband interface, and an Ethernet chip for storing and forwarding Ethernet packets between the twisted pair broadband chip and the external Ethernet interface. For operation of the MC and to initialize and control the above mentioned chips, there is a Field Programmable Gate Array (FPGA) within the MC. All or most of the functionality of the MC can be incorporated into a single chip which can then reside within the IP device such as the IP telephone thereby incorporating the MC functionality into the IP phones. The media converter includes two connectors, one interfacing with the existing twisted pair wiring and the other interfacing with an Ethernet wiring. The Ethernet wiring connects to an internet device such as an internet protocol (IP) telephone. This system has dedicated cabling for voice traffic independent of data transport. The dedicated cabling is from a central PBX switch room to every desktop that requires an IP telephone (telephone and phone are interchangeably used herein). The system can transport IP voice traffic and power simultaneously for distances that are many times greater than 100 meters.

The system also supplies power to the internet protocol telephony transport. The entire TPBS is connected to a battery backed up power source which allows the entire telephony system to be available even when there is a power outage in the building or at the premises of the customers. During normal operation, as the system runs or operates from power derived from conventional electrical power lines, the battery gets automatically charged. When the conventional power is cut off or shuts down, the battery back up will provide power to the telephony system according to its available uninterrupted power supply (UPS) rating. To ensure optimum supply of power, the TPBS supplies power to each individual twisted pair wire and isolates each wire pair from all others so that any failures in one line will not bring down other phone lines. A power insertion logic within an interface card of the TPBS inserts power to the twisted pair wiring via its interface in the same manner as it inserts power to the Ethernet wiring. The TPBS, through its twisted pair interface, provides power to the MC over the same wiring infrastructure. The TPBS has a smart logic within the power insertion logic which ensures that an MC is connected on a particular twisted pair wire before supplying power to the MC for safety reasons. The MC uses this power for itself, and also passes it on to the IP device such as the IP telephone, according to the IEEE 802.3af standard or other proprietary methodologies. IEEE 802.3af standard supports power only to a maximum distance of 100 meters. The system herein allows power to be carried through distances many times greater than 100 meters to Ethernet devices such as the IP phones which eliminates the need to build back up power in every data switch room across the building.

A method of using a twisted pair infrastructure for simultaneously transporting internet protocol voice traffic and power to an internet protocol telephony transport, comprises connecting one end of a twisted pair broadband switch to an internet protocol telephone voice switch using an Ethernet wiring; connecting a second end of the twisted pair broadband switch to a twisted pair wiring using a twisted pair wiring interface on the twisted pair broadband switch; connecting the twisted pair wiring to a twisted pair wiring interface of a media converter; connecting an internet protocol telephone to the Ethernet interface of the media converter for receiving or sending voice communication; transporting through the twisted pair broadband switch, internet protocol voice traffic within Ethernet frames over the twisted pair wiring using a broadband technology; conditioning voice traffic between the twisted pair interface and the Ethernet interface by the media converter; and, supplying power to the internet protocol telephony transport from a battery back up power source connected to the twisted pair broadband switch.

A method of supplying power during power outages to an internet protocol telephony transport using a twisted pair infrastructure, comprising: supplying power from an electrical line power source to a twisted pair broadband switch having a back up battery connected between the power source and the twisted pair broadband switch, the electrical line power source automatically charging the back up battery while the internet protocol telephony transport is in operation; connecting the twisted pair broadband switch to a twisted pair wire of the twisted pair infrastructure; connecting a media converter to the twisted pair wire; ensuring connection between the twisted pair wire and the media converter before allowing power to traverse the twisted wire to the media converter; passing power from the media converter to an internet protocol device such as an internet protocol telephone; and, providing power to the internet protocol telephony transport by the back up battery when the electrical line power source shuts down during operation. This method can also be used to power internet protocol systems not using the twisted pair infrastructure. Here, one only needs to connect one internet protocol device such as an Internet Protocol based voice telephony switch on an Ethernet port of the twisted pair broadband switch having the battery back up. This IP device can then connect to another internet protocol device such as an internet protocol telephone using another Ethernet port of the twisted pair broadband switch.

DETAILED DESCRIPTION OF THE INVENTION

Figure 1:
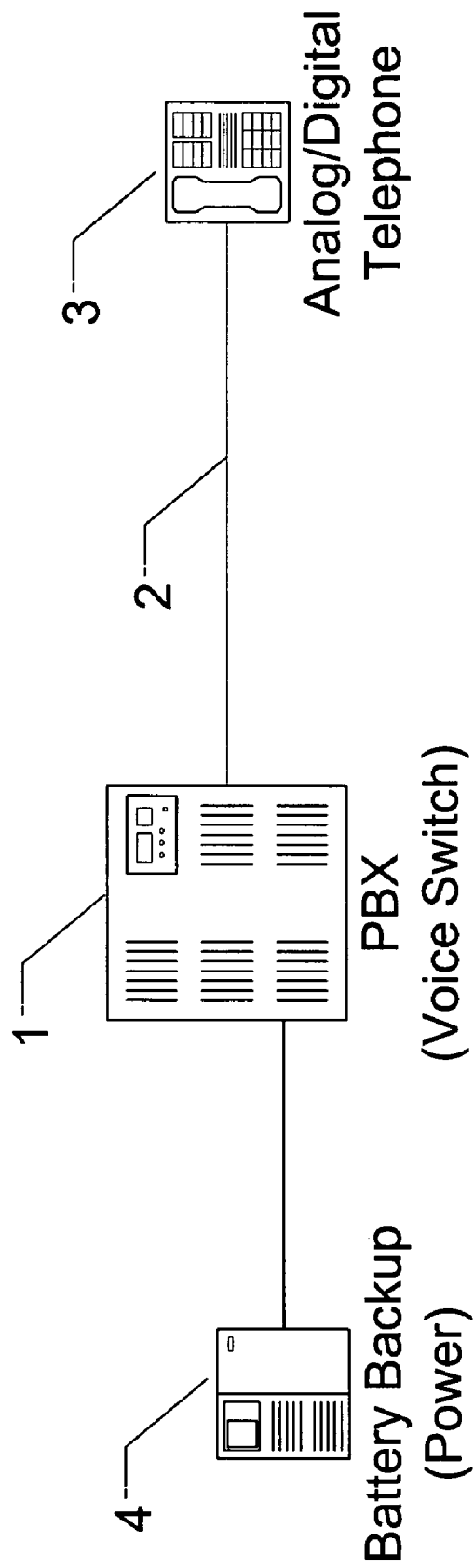
FIG. 1 is a block diagram (prior art) of the conventional telephony transmitted through dedicated pair of wires.

Conventional telephony is still widely used as it has been in deployment for several decades. FIG. 1 shows the conventional telephony system, solely a voice network, which uses the twisted pair infrastructure usually made out of a conducting material such as copper, hereinafter referred to as twisted pair infrastructure. In this system, each Analog or Digital telephone 3 has a dedicated pair of wires 2, which terminate on a line card of the PBX 1, a telephone voice switch. Voice networks within an enterprise typically run over lower grade cable, such as Categories 1-3 (CAT1-3) cabling and other equivalents. The PBX houses the call control and switching functions. Most PBX switches have battery backup 4 to ensure operation during power outages. The battery backup 4 also provides power to the analog or digital telephones 3 through the PBX 1, over the copper wiring 2. This ensures that the phone system is available during times of crises, even when the building electrical power is impaired or shut off.

Figure 2:
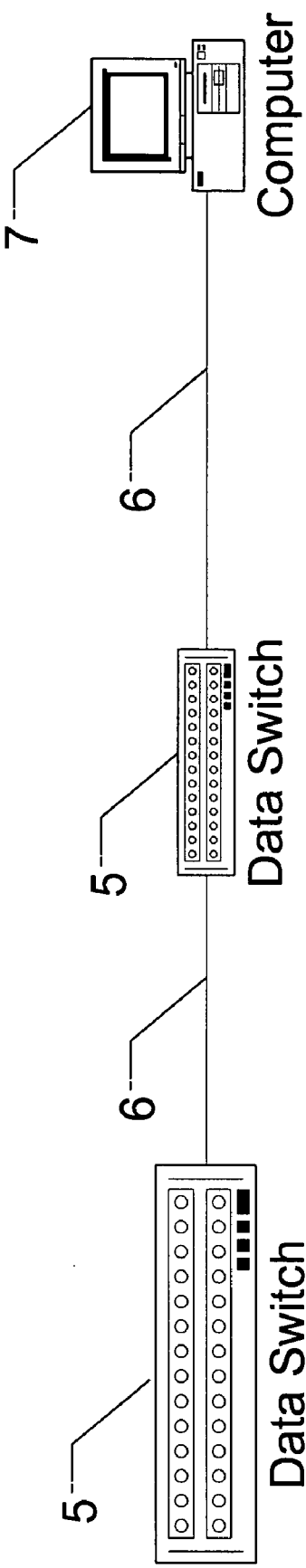
FIG. 2 is a block diagram (prior art) of a LAN data connectivity.

Data transmission (herein, transmission is used interchangeably with transport) typically runs on Local Area Network (LAN) or through a Wide Area Network (WAN). Within the customer premises, data runs on Local Area Networks (LANs). This network has consisted of Ethernet, Token Ring, and some ATM. Today Ethernet has emerged as the dominant LAN technology and has the greatest market share. The physical wiring that is required to run Ethernet is typically Category 5 (CAT5) cabling or its equivalent which is widely deployed within buildings. FIG. 2 shows a typical LAN connecting a computer 7 over cabling 6 which carries Ethernet traffic and physically connects to a data switch 5 or a router. As shown in FIG. 2, data networks typically are not provided with battery back up and are rendered dysfunctional in the event of power loss. Even if loss of data network is not desirable, it is a reality that many businesses have learned to live with. However, loss of phone operation is highly unacceptable.

Figure 3:
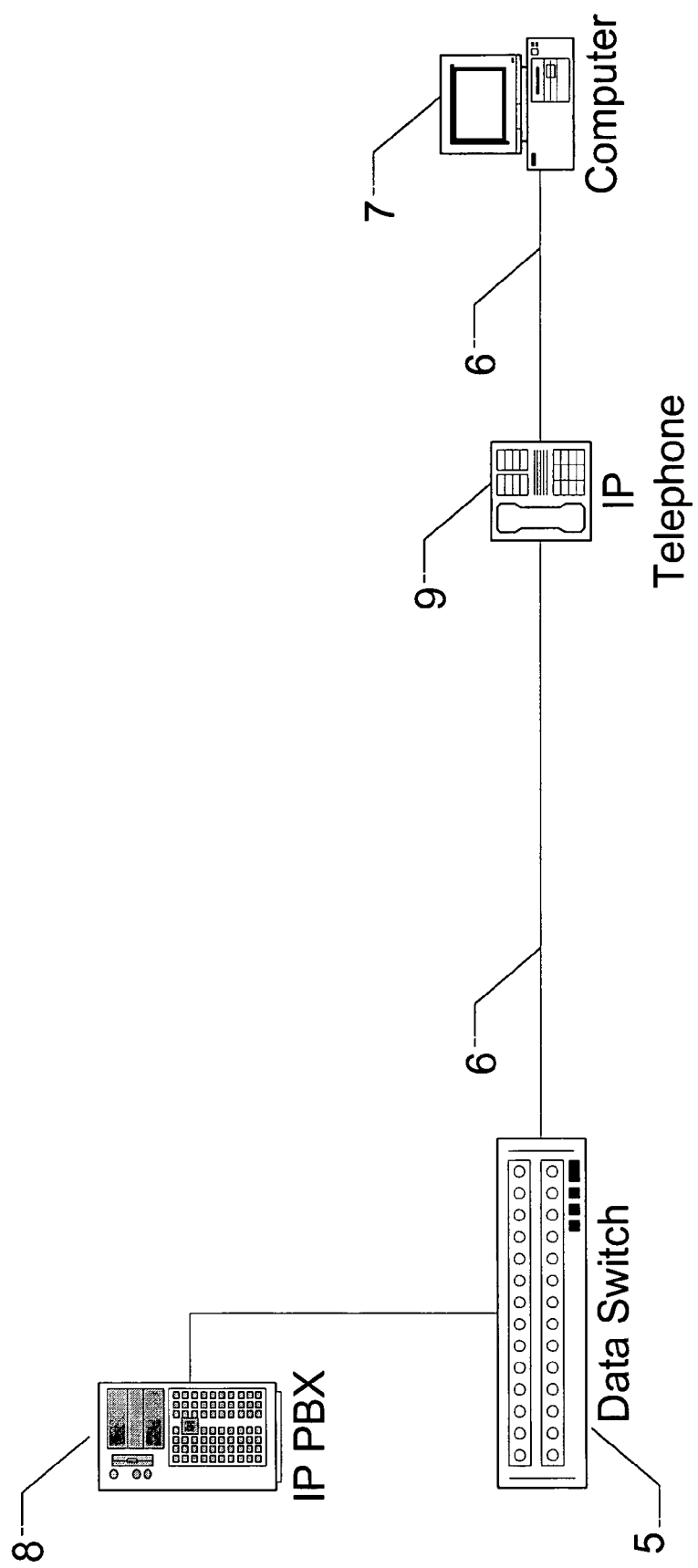
FIG. 3 is a block diagram (prior art) of a converged network with voice transmission or transport over a data network.

There has been a push towards convergence i.e. using the data network to transport voice. This is due to the fact that data traffic volumes have exceeded voice traffic and enterprises stand to save money by sending voice on data networks. FIG. 3 shows the present connectivity of Ethernet based voice traffic from an IP PBX 8 to the data switch 5. The Ethernet over cable 6 such as CAT5, carries voice and data traffic to the IP telephone 9. The cable capable of carrying Ethernet traffic is also referred to herein as Ethernet wiring. Voice traffic is handled at the IP telephone and data traffic is passed on to the computer 7. The sharing of the same wiring for both voice and data transmission has some difficulties, such as echo, conversation collision and choppy or patchy voice performance.

Figure 4:
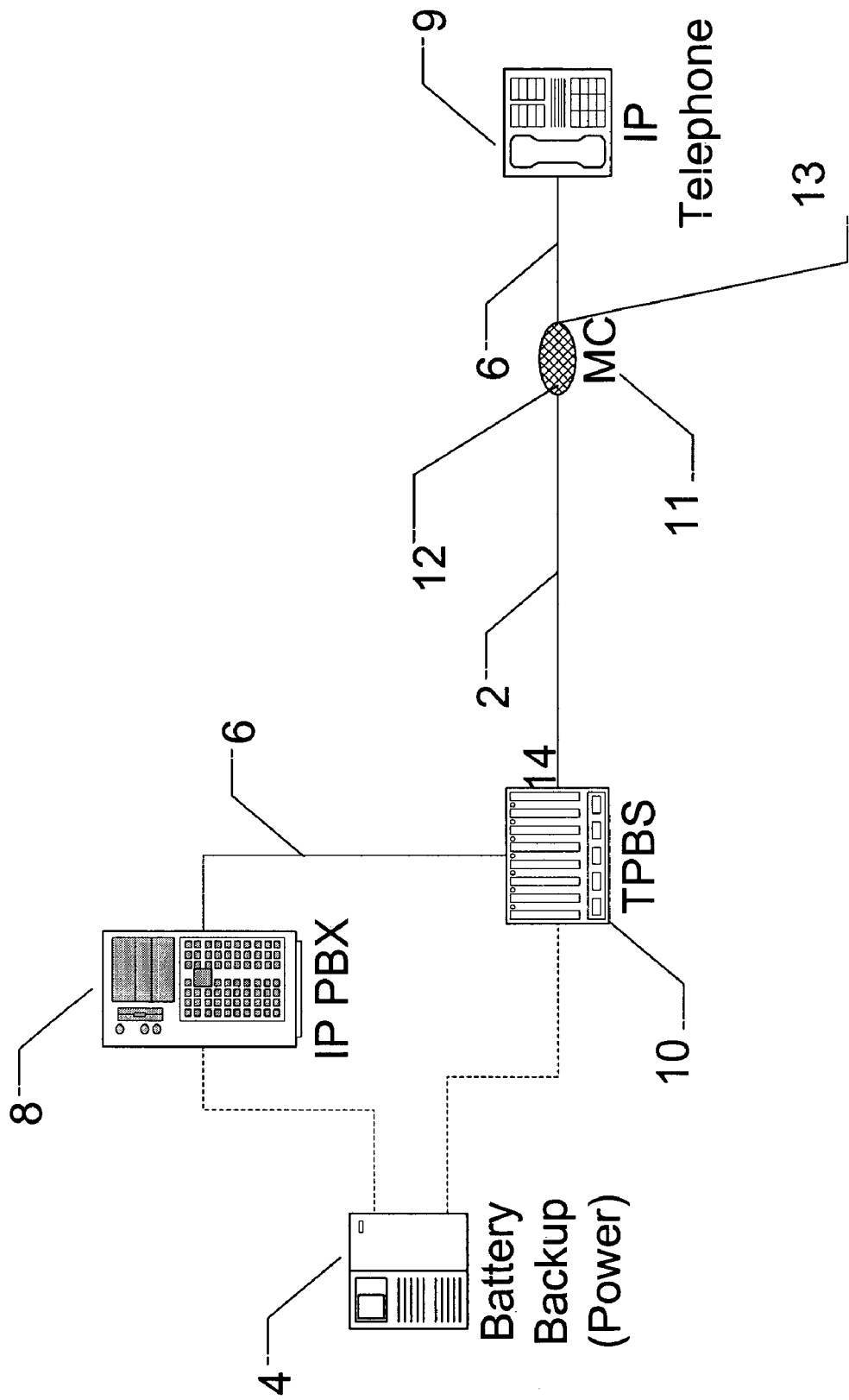
FIG. 4 is a block diagram of the IP Telephony transport incorporating the Twisted Pair Broadband Switch (TPBS) and Media Converter (MC) for transporting IP voice traffic and power over the twisted pair infrastructure.

The claimed invention shown in FIG. 4 is an IP telephony system that takes on the advantages experienced with dedicated cabling for voice transport and adopts the concept of battery back up to ensure operation during power outages by incorporating devices, herein a battery backed up twisted pair broadband switch (TPBS) 10 and a media converter 11, that allows the transport of IP voice over conventional twisted copper infrastructures thereby minimizing the cost of hardware replacement involved in upgrading the data LAN to handle QoS (Quality of Service) for voice transport. The IP PBX 8 is connected to the IP telephone 9 through the twisted pair copper infrastructure 2. To enable the twisted pair copper wiring 2 to transport Ethernet voice traffic and power simultaneously, between the IP PBX 8 and the IP Phones 9, there are two devices introduced into the network, the TPBS 10 and the Media Converter 11. The twisted pair copper wiring connects the TPBS 10 and the Media Converter 11. The IP PBX 8 connects to the TPBS 10 using its standard CAT5 or similar Ethernet wiring 6. The IP Phone 9 connects to the Media Converter 11 using an Ethernet connection over CAT5 or similar cabling 6. The TPBS 10 and the Media Converter 11 allow the transport of Ethernet traffic and power over any twisted pair wire infrastructure such as the twisted pair copper wiring that exists in the business environments.

This claimed system ensures the dedicated path for transmission of IP based voice traffic and power between the IP telephone and the IP PBX, that is, without sharing the path with the data network, thus avoiding the problems associated with the transmission of voice traffic over the data network infrastructure. This also provides in-line power to IP phones through the twisted pair infrastructure. Each IP device, including the IP telephones, is guaranteed QoS all the way to a dedicated port in the TPBS 10.

The TPBS is a system that can accommodate various types of input/output (I/O). The function of the TPBS is to take in Ethernet based traffic from a source such as IP PBX, power from a different source, and then transport the two inputs simultaneously over twisted pair wiring, using a broadband technology such as xDSL (a family of Digital Subscriber Loop), EFM (Ethernet in the First Mile), and technologies that support packet traffic over a voice grade twisted pair physical layer. The main types of I/O interfaces include the twisted pair broadband interface 10a and the Ethernet Interface 10b. These are usually in the form of insertable cards in a chassis configuration. In addition to these I/O interfaces, other I/O interfaces such as traditional analog voice ports and T1l/E1 Primary Rate ports for media gateway applications, as well as $3^{rd}$ party vendor proprietary digital phone interfaces may be supplied by the TPBS. Also, other functionality that can be supported by the TPBS include cards for voice mail, IP PBX and Call Center.

The media converter, MC 11, enables the attachment of existing IP phones to the twisted pair broadband switch 10 using the twisted pair broadband interface card (TPBC) 10a for connectivity to existing twisted pair wiring at the customer sites. All IP phones come equipped with an Ethernet interface. The MC conditions Ethernet traffic to and from such IP phones to the appropriate twisted pair broadband technology mentioned above. Although FIG. 4 shows the MC as a separate device, MC functionality can be integrated into the IP phones as well.

Figure 5:
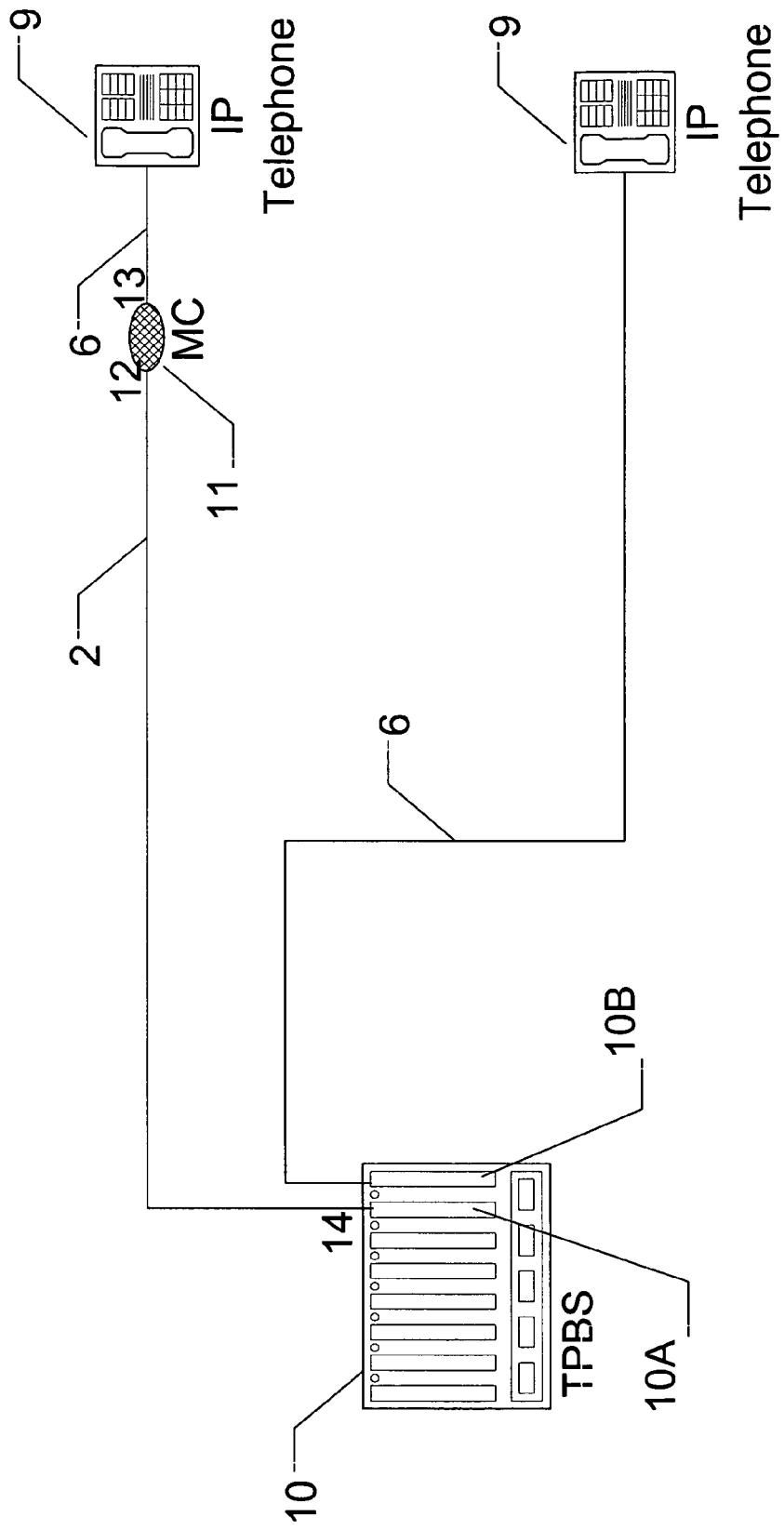
FIG. 5 shows the main interface cards incorporated into the TPBS device.

The MC 11 has two connectors, 12 and 13. It has a twisted pair interface 12, for example RJ11 or equivalent, that connects to the twisted pair wiring 2, and an Ethernet Interface 13, for example RJ45 or equivalent, that connects to cable 6, where an IP telephone can be attached. The interfaces, RJ11 and RJ45 are commercially available. RJ11 is used by current telephones while RJ45 is typically used to connect computers and devices such as switches, routers, and hubs. MC is capable of conditioning Ethernet traffic and receiving power from the twisted pair interface 12 and delivering it to the Ethernet interface 13. Conditioning herein means coding the Ethernet voice traffic to enable this to traverse the twisted pair wiring and vice versa. The TPBS 10, through its twisted pair interface, provides power to the MC over the same wiring infrastructure 2 as shown in FIGS. 4 and 5. The MC uses this power for itself, and also passes it on to the IP telephone 9, according to the IEEE 802.3af standard over cabling 6, typically a CAT5. There are some vendors that use proprietary methodologies other than IEEE 802.3af standard, and the MC can support these schemes as well. The entire TPBS is connected to a power source which is battery backed up as shown in FIG. 4, which allows the entire telephony system to be available even when there is a power outage in the building or at the premises of the customers. During normal operation, as the system runs from power derived from conventional electrical power lines, the battery gets automatically charged. When the conventional power is cut off, the battery back up will provide power to the telephony system for as long as the battery is charged. This depends upon the available uninterrupted power supply (UPS) rating of the back up battery. Power outages usually do not last longer than the life of the battery, thereby allowing uninterrupted voice transmission especially during emergencies such as catastrophic events like fire, earthquake terrorist attack, etc. Data transmission through a battery backed up TPBS will experience the same advantage of uninterrupted service.

FIG. 5 shows the TPBS 10 Chassis, with the two main types of interface cards identified above, the Twisted Pair Broadband Card (TPBC) 10a and the Ethernet Interface Card 10b. The card 10a allows transmission or transport of IP voice traffic within Ethernet frames over the twisted pair wiring 2 using the twisted pair broadband technology. The TPBC 10a physically connects to the twisted pair wiring 2, that exists in the building for connectivity and usage of traditional Analog or Digital telephones. Essentially, the presence of the MC 11 and the TPBS 10 is transparent to the IP telephone. The MC and the TPBS emulate an Ethernet network and provide a dedicated path for this communication, while bypassing the data network where difficulties can be encountered. The Ethernet Interface card 10b has within the card, standard Ethernet interfaces or ports. These ports can connect the IP PBX Ethernet Interface and other various applications such as Voice Mail, Unified Messaging, etc. to the Ethernet ports of the TPBS. In a system not using the twisted pair infrastructure, an IP telephone 9 and a computer 7 can directly connect to one of the ports of the TPBS Ethernet card 10b and in this case, be provided with in-line power to the IP telephone 9 and computers 7 over Ethernet wiring using the IEEE 802.3af standard, or using IP telephone vendor's proprietary power schemes. Even though the TPBS is shown here as a chassis based switch, the functionality of multiple cards can be implemented within a single small switching device for smaller applications and remote sites.

Figure 5A:
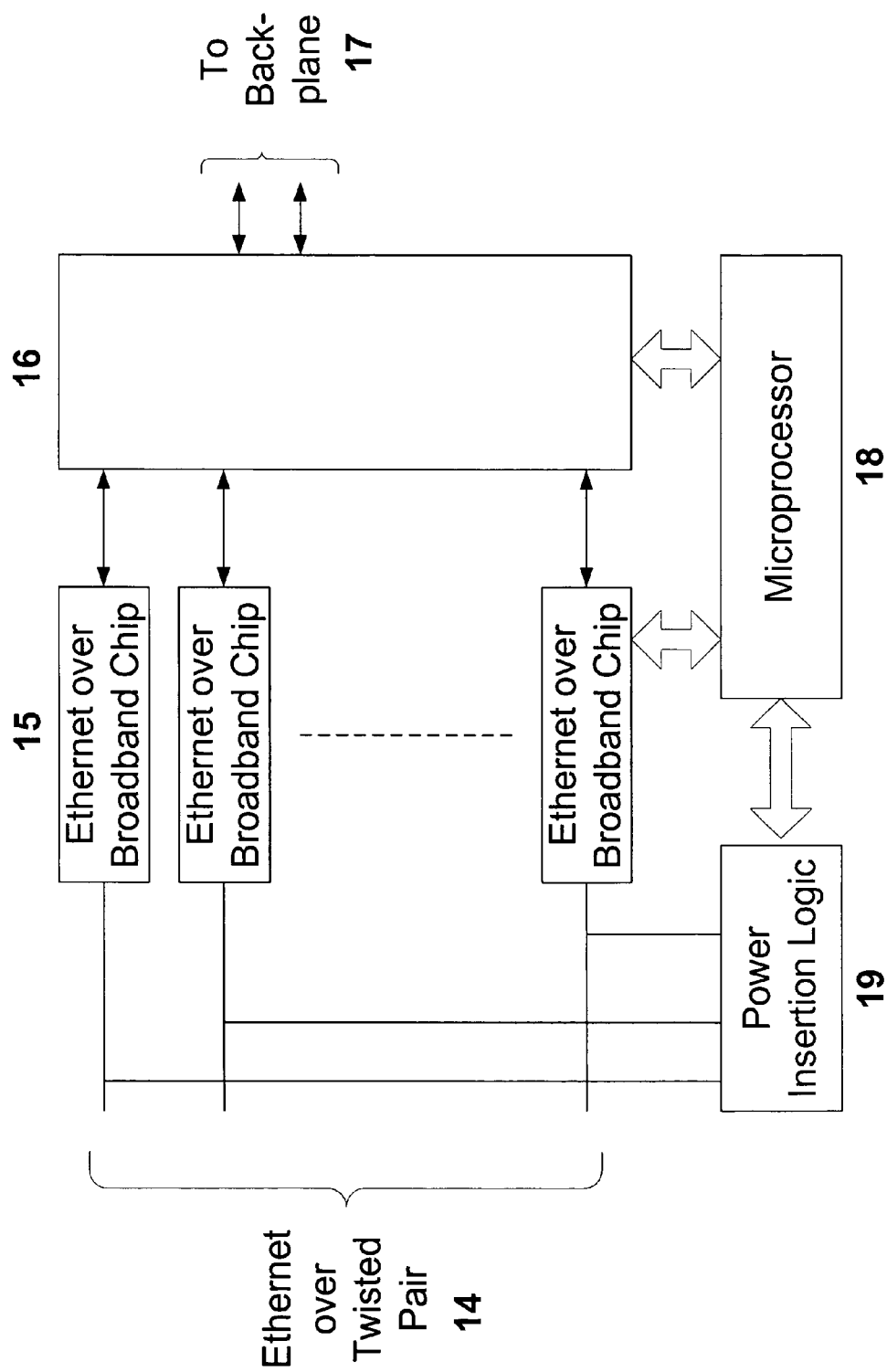
FIG. 5A is a block diagram of the Twisted Pair Broadband Card.

FIG. 5A shows a block diagram of the twisted pair broadband card (TPBC) 10a inserted into the TPBS. The card comprises an Ethernet switch chip 16 having several ports which has the function of switching Ethernet packets between its ports. This card 10a connects to other cards within the TPBS through a chassis backplane using internal connectors 17. Beyond the backplane, there are external Ethernet ports on other cards where an IP PBX may be connected. IP voice traffic comes into the TPBC, 10a, through the backplane, and is carried to the IP phone connected at one end of the twisted pair wiring interface 14 as follows: Ethernet traffic that is received by the switch chip 16 is conditioned by the Ethernet over broadband chip 15 and carried on the twisted pair wiring by using known devices such as an analog front end (AFE) which is incorporated within the broadband chip 15 or added to the TPBC 10a. A power insertion logic 19 within the card 10a inserts power onto the twisted pair wiring via the interface 14 in the same manner as it inserts power onto the Ethernet wiring. The interface 14 is usually connected to the twisted pair wiring by a bulk connector. The Ethernet over broadband chips and the Ethernet switch chips are commercially available and ensure the proper conditioning of the transport medium from Ethernet to the twisted pair copper wiring. The microprocessor 18 and other logic is involved in ensuring proper handling of the frames and management and configuration of the devices. There is also a Field Programmable Field Array (FPGA) chip on the TPBC 10a. This FPGA chip is commercially available. It includes programming that is specific to supporting the claimed invention. The FPGA's main function is to incorporate many small functions that are necessary for the operation of the TPBC into a single chip. The power insertion module or logic 19 ensures that it provides in-line power over the twisted pair interface 14 where the MC and subsequently IP telephone are going to be connected. This logic 19 can be incorporated within the FPGA.

Figure 6:
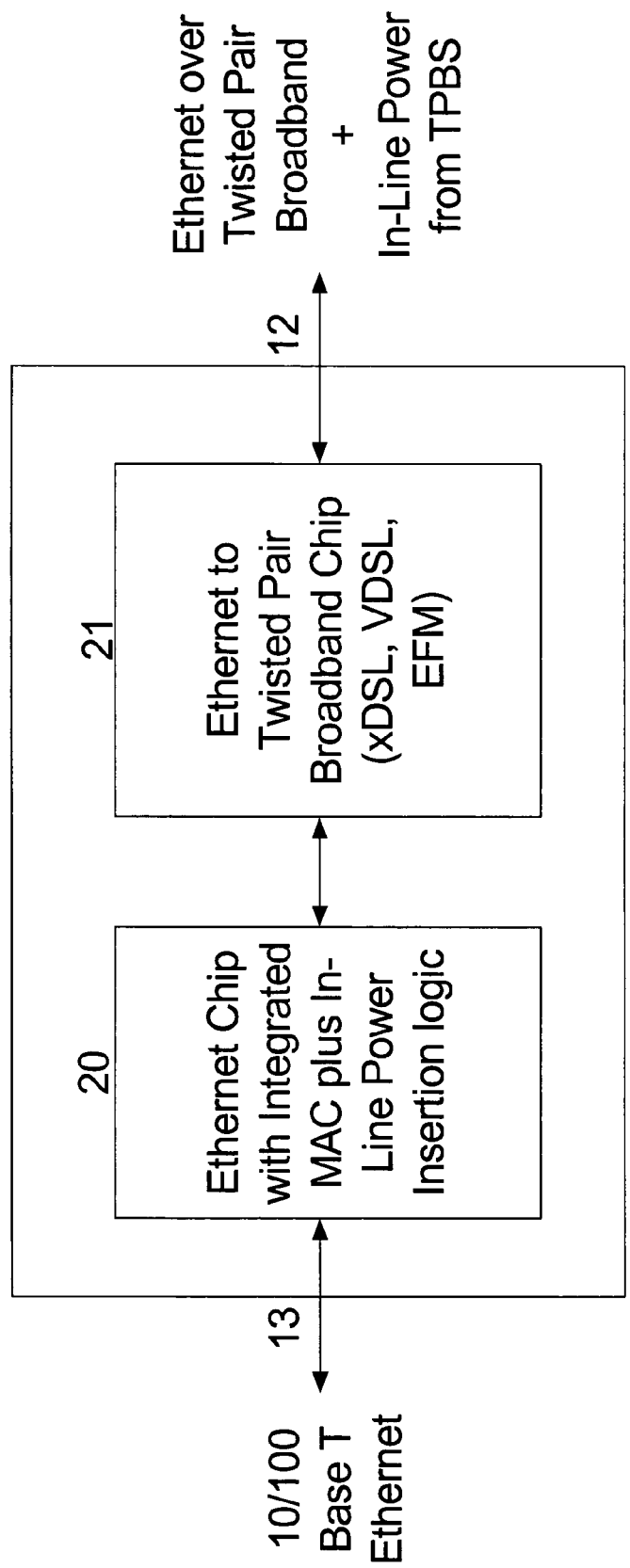
FIG. 6 is a block diagram of the Media Converter.

FIG. 6 shows the components and mechanism of the MC 11. The IP voice traffic and power from the TPBS 10 comes into the MC 11 and is received at the twisted pair interface 12. This traffic is then converted or conditioned for transport over an Ethernet wiring using the Ethernet to Twisted Pair Broadband Chip 21. The Ethernet Chip 20 switches the traffic between the twisted pair broadband chip 21 and the external Ethernet Interface 13. It stores and forwards Ethernet packets between the twisted pair broadband chip 21 and the external Ethernet Interface 13. The Ethernet traffic is then passed on to the attached appliance such as an IP telephone over the Ethernet interface 13. FIG. 6 shows an Ethernet chip with integrated media access control and power insertion logic. Along with the Ethernet traffic, power is also passed through the cable 6, typically a CAT 5 using the IEEE 802.3af standard. Ethernet chips are widely available and can have various differences in functionality. It is required that the IEEE 802.3 af based power compliance be supported by the MC. Consequently, the implementation of the power control logic within the Ethernet Chip 20 may be part of the Ethernet Chip 20 or may be implemented within the MC, separate from the Ethernet Chip. The design of the MC 11 includes an FPGA and several functions of the MC are administered by the FPGA. These functions include management and configuration of the other chips and maintaining communication between the MC and the TPBS. The FPGA is a commercially available chip with software coding to support the specific functions required within the MC. The FPGA may include functionality related to a microprocessor and power control logic. This allows the size, power requirement and cost for the MC to be reduced. All or most of the functions within the MC can be incorporated in a single chip which will allow the entire MC functionality to be incorporated within an IP device such as the IP telephone.

The supply of power to each desktop IP phone through the MC 11 from a central location using the twisted pair wiring is described in more detail herein. The TPBS 10 supplies power to each individual twisted pair wire 2 and isolates each wire pair from all others so that any failures on one line will not bring down other phone lines. The TPBS 10, particularly TPBC 10a has smart logic within the power insertion logic 19 as shown in FIG. 5A which ensures that an MC 11 is connected on a particular twisted pair wire before power is applied for safety reasons. Once the MC receives this power from the twisted pair interface 12, power is supplied to the IP device, such as an IP phone 9 through Ethernet wiring 6 using IEEE 802.3af standard. The MC, in accordance with the IEEE 802.3af standard ensures that the IP device is capable of receiving power on the Ethernet interface. IEEE 802.3af standard supports power which has a maximum distance of 100 meters. The system as designed herein allows power to be carried at distances many times greater than 100 meters to Ethernet devices such as the IP phones. This eliminates the need to build back up power in every data switch room across the building. The power at the central station is battery backed, hence, operational during facility outages.

Figure 7:
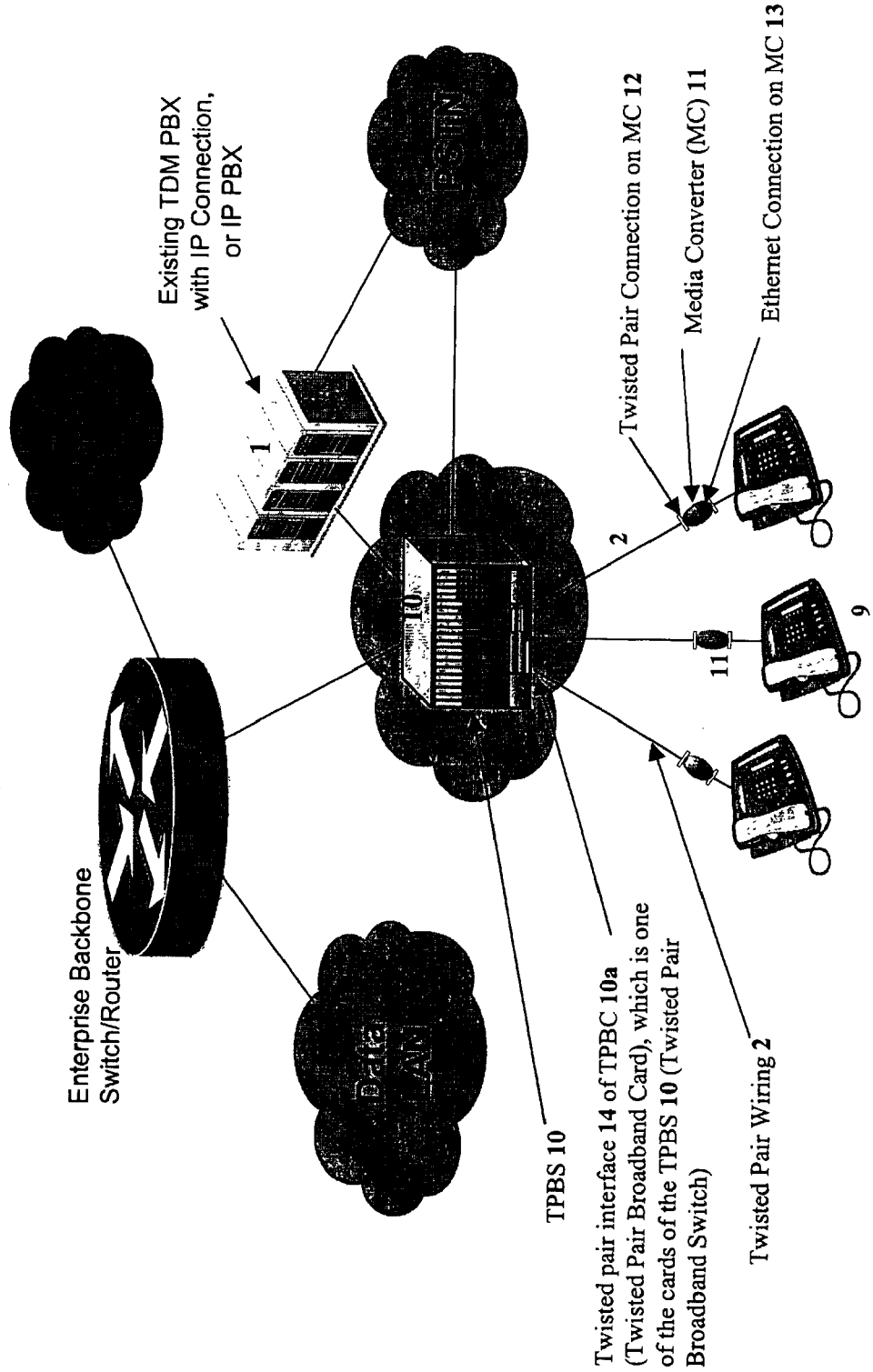
FIG. 7 is an overall network diagram incorporating the twisted pair infrastructure with the TPBS and MC.

FIG. 7 is a general diagram of the switching system proposed, which allows an enterprise customer to deploy IP telephony without any disruption to the Data LAN and at the same time provides in-line power to the attached IP phones. One of the Ethernet ports in the TPBS 10 can be used to connect to the building LAN, so IP phone users have access to information like the company directory, which resides on a server on the building LAN. Another Ethernet port on 10 can be connected to the WAN router so voice connectivity is available between premises that are geographically displaced. As can be seen, no voice traffic traverses the building LAN, both voice payload and control traffic remain confined to the dedicated twisted pair network.

The main advantages of the claimed invention can be summarized as follows: customers do not have to spend money on upgrading the LAN in order to make it QoS suitable for data and voice to share the same LAN because data LAN remains untouched and IP voice traverses the twisted pair infrastructure, which is already presently being used by analog and digital phones; customers do not have to employ highly skilled traffic engineering personnel to constantly monitor the LAN in order to provide optimum performance on the LAN so that voice quality does not degrade under varying traffic conditions; customers do not have to provide backup power to every data closet in order to battery backup every hub, switch and router because the TPBS is battery backed up and provides in-line power to all IP phones that are attached to the TPBS through the MC; and, due to the fact that voice runs on a physically separate wiring, using the existing twisted pair infrastructure with each IP phone having a point-to-point connection to the TPBS, the system offers equivalent security for voice calls as the current PBX switches. As stated above, if data and IP voice traverse the same physical LAN, an experienced hacker can connect to the building LAN and record conversations long enough to break the code and subsequently listen in on all conversations. With the proposed system, still using the existing twisted pair infrastructure through the TPBS, a hacker will still have to gain access to the MDF as in the conventional telephone system in order to listen in on conversations. In business environments access to the MDF is restricted, thus minimizing the risk of unauthorized eves dropping.

While the embodiment of the present invention has been described, it should be understood that various changes, modifications and adaptations may be made therein without departing from the spirit of the invention and the scope of the appended claims. The examples and illustrations presented are not intended to be exhaustive or to limit the invention to the precise form disclosed. Those skilled in the art will recognize that other and further modifications or variations of the features presented herein are possible in light of the above teachings. The teachings herein enable one of ordinary skill in the art to utilize the invention in various embodiments and with various modifications as are suited for the particular use contemplated. The scope of the present invention should be determined by the teachings disclosed herein and the appended claims when interpreted in accordance with the breath to which they are fairly, legally and equitably entitled.

We claim:

1. A system for simultaneously transporting internet protocol voice traffic and power between an Internet Protocol telephone and an Internet Protocol voice telephony switch using twisted pair wiring comprising:
   a twisted pair broadband switch, the twisted pair broadband switch connecting on one end to an internet protocol telephone voice switch using Ethernet wiring and connecting on another end to a media converter comprising a twisted pair interface for receiving voice traffic and power from the twisted pair broadband switch through the twisted pair wiring, a twisted pair broadband chip for conditioning Ethernet traffic to be carried on a broadband interface, an Ethernet chip for storing and forwarding Ethernet packets between the twisted pair broadband chip and the external Ethernet interface, and a Field Programmable Gate Array for initializing and controlling the twisted pair broadband chip and the Ethernet chip, the media converter conditioning voice traffic between a twisted pair interface and an Ethernet interface to allow connection to an internet protocol telephone; and,
   a power source connected to the twisted pair broadband switch for providing in-line power to the telephony system.

2. The system of claim 1 wherein the twisted pair broadband switch comprises several types of input/output interfaces.

3. The system of claim 2 wherein one type of interface is a twisted pair wiring interface using broadband technology.

4. The system of claim 3 wherein the interface is a card allowing transport of internet protocol voice traffic within Ethernet frames over the twisted pair wiring.

5. The system of claim 4 wherein the card comprises an ethernet switch chip for receiving Ethernet traffic, an Ethernet over broadband chip for conditioning the Ethernet traffic for transport over the twisted pair wiring and a chip having power insertion logic for providing in-line power to the telephony system.

6. The system of claim 2 wherein the twisted pair broadband switch includes input/output interfaces for existing applications and devices.

7. The system of claim 2 wherein one type of interface is an Ethernet interface.

8. The system of claim 7 wherein the interface is a card having standard Ethernet ports for connectivity to Ethernet based application and devices.

9. The system of claim 1 wherein the media converter functionality is incorporated into a single chip, thereby allowing integration into an internet protocol telephone.

10. The system of claim 1 wherein the media converter comprises two connectors, one interfacing with the existing twisted pair wiring and the other interfacing with the Ethernet wiring, the Ethernet wiring connecting to an internet protocol telephone.

11. The system of claim 1 wherein the twisted pair broadband switch supplies power to the media converter over the twisted pair wiring, the media converter passing the supplied power to an internet protocol telephone.

12. The system of claim 11 wherein the twisted pair broadband switch has a smart logic within a power insertion logic for ensuring that an MC is connected on a particular twisted pair wire before applying power to the MC.

13. The system of claim 1 wherein the twisted pair broadband switch directly supplies power to an internet protocol telephone from an Ethernet port of the twisted pair broadband switch.

14. The system of claim 1 wherein the internet protocol telephony transport has dedicated cabling independent of data transport.

15. The system of claim 1 wherein the internet protocol telephony transport carry power over distances of many times greater than 100 meters.

16. The system of claim 1 wherein the power source is backed up by a battery.

17. The system of claim 1 wherein the twisted pair wiring is an existing twisted pair wiring used for connecting traditional phones, analog and digital phones.

18. A method of using a twisted pair infrastructure for simultaneously transporting internet protocol voice traffic and power to an internet protocol telephony transport, comprising:
   a) connecting one end of a twisted pair broadband switch to an internet protocol telephone voice switch using an Ethernet wiring;
   b) connecting a second end of the twisted pair broadband switch to a twisted pair wiring using a twisted pair wiring interface on the twisted pair broadband switch;
   c) connecting the twisted pair wiring to a twisted pair wiring interface of a media converter;
   d) connecting an internet protocol telephone to an Ethernet interface of the media converter for receiving or sending voice communication;
   e) transporting through the twisted pair broadband switch, internet protocol voice traffic within Ethernet frames over the twisted pair wiring using a broadband technology;
   f) conditioning internet protocol voice traffic between the twisted pair wiring interface and the Ethernet interface by the media converter;
   g) receiving the internet protocol voice traffic at the media converter from the twisted pair interface and converting this voice traffic from a broadband transmission media to Ethernet frames;
   h) receiving internet protocol voice traffic from the internet protocol telephone at the media converter through the Ethernet interface;
   i) conditioning internet protocol voice traffic for transport using the broadband technology over the twisted pair wiring interface; and,
   j) supplying power to the internet protocol telephony transport from a battery back up power source connected to the twisted pair broadband switch.

19. The method of claim 18 wherein the internet protocol voice traffic and power are simultaneously transported over a distance of many times greater than 100 meters.

20. The method of claim 18 wherein steps g)-i) are incorporated in a single chip on the media converter and incorporated within the internet protocol telephone or Internet protocol device.

21. A method of supplying power during power outages to an internet protocol telephony transport using a twisted pair infrastructure, comprising:

supplying power from an electrical line power source to a twisted pair broadband switch having a back up battery connected between the power source and the twisted pair broadband switch, the electrical line power source automatically charging the back up battery while the internet protocol telephony transport is in operation;

a) connecting the twisted pair broadband switch to a twisted pair wire of the twisted pair infrastructure;

b) connecting a media converter to the twisted pair wire;

c) ensuring connection between the twisted pair wire and the media converter before allowing power to traverse the twisted pair wire to the media converter;

d) receiving power at the media converter from the twisted broadband switch through the twisted pair wire;

e) applying power to an Ethernet interface at the media converter when an internet protocol telephone or internet protocol device able to receive power is attached to the Ethernet interface;

f) passing power from the media converter to an internet protocol device such as an internet protocol telephone; and, g) providing power to the internet protocol telephony transport by the back up battery when the electrical line power source shuts down during operation.

* * * * *